(12) United States Patent
Pouzadoux et al.

(10) Patent No.: US 10,619,486 B2
(45) Date of Patent: Apr. 14, 2020

(54) BLADE, ASSOCIATED FAN AND TURBOJET ENGINE

(71) Applicant: SAFRAN AIRCRAFT ENGINES, Paris (FR)

(72) Inventors: Frédéric Jean-Bernard Pouzadoux, Moissy-Cramayel (FR); Alain Jacques Michel Bassot, Moissy-Cramayel (FR); Jérémy Guivarc'h, Moissy-Cramayel (FR); Jean-Louis Romero, Moissy-Cramayel (FR); Thibault Ruf, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 112 days.

(21) Appl. No.: 16/064,219

(22) PCT Filed: Dec. 21, 2016

(86) PCT No.: PCT/FR2016/053608
§ 371 (c)(1),
(2) Date: Jun. 20, 2018

(87) PCT Pub. No.: WO2017/109408
PCT Pub. Date: Jun. 29, 2017

(65) Prior Publication Data
US 2019/0010807 A1    Jan. 10, 2019

(30) Foreign Application Priority Data
Dec. 21, 2015   (FR) ..................... 15 63009

(51) Int. Cl.
*F01D 5/28*      (2006.01)
*F01D 5/14*      (2006.01)
(Continued)

(52) U.S. Cl.
CPC ............. *F01D 5/147* (2013.01); *F01D 5/282* (2013.01); *F04D 29/023* (2013.01);
(Continued)

(58) Field of Classification Search
CPC .......... F01D 5/147; F01D 5/282; F01D 5/288; F04D 29/388; F04D 29/023; F05D 2240/303; F05D 2220/36
See application file for complete search history.

(56) References Cited

U.S. PATENT DOCUMENTS

| 3,892,612 A | 7/1975 | Carlson et al. |
| 5,908,285 A * | 6/1999 | Graff ........................ C25D 1/10 205/67 |

(Continued)

FOREIGN PATENT DOCUMENTS

| EP | 1 032 749 B1 | 6/2002 |
| EP | 2 256 296 A2 | 12/2010 |

(Continued)

OTHER PUBLICATIONS

Written Opinion of the International Searching Authority dated Mar. 22, 2017, in International Application No. PCT/FR2016/053608 (7 pages).

(Continued)

*Primary Examiner* — Eldon T Brockman
(74) *Attorney, Agent, or Firm* — Bookoff McAndrews, PLLC

(57) ABSTRACT

A leading-edge shield (32) for a turbomachine blade (16) includes a pressure-side wing (34) and a suction-side wing (36). Each of the wings (34, 36) extends along a height (H) from a bottom edge (50) to a top edge (51) and along a length, from the leading edge to a respective rear edge, and are connected together over the leading edge. At least one of the wings from among the suction-side wing (36) and the pressure-side wing (34) presents a segment (S1), adjacent to the top edge (51) and extending over at least 10% of the height (H), wherein the rear edge (42) slopes towards the top edge (51).

6 Claims, 1 Drawing Sheet

(51) Int. Cl.
*F04D 29/02* (2006.01)
*F04D 29/38* (2006.01)

(52) U.S. Cl.
CPC ............ *F04D 29/388* (2013.01); *F01D 5/288* (2013.01); *F05D 2220/36* (2013.01); *F05D 2240/303* (2013.01); *F05D 2240/307* (2013.01); *F05D 2300/603* (2013.01)

(56) References Cited

U.S. PATENT DOCUMENTS

| | | | |
|---|---|---|---|
| 8,376,712 B2 * | 2/2013 | Klinetob | ................ F01D 5/147 416/224 |
| 10,245,792 B2 * | 4/2019 | Collis | ................ B29C 66/1122 |
| 2018/0111332 A1 * | 4/2018 | Collis | ................ B29C 66/1122 |

FOREIGN PATENT DOCUMENTS

| | | |
|---|---|---|
| EP | 2 299 123 A2 | 3/2011 |
| EP | 2 458 153 A2 | 5/2012 |
| EP | 2 594 805 A1 | 5/2013 |
| GB | 2 298 653 A | 9/1996 |
| WO | 99/27234 A1 | 6/1999 |

OTHER PUBLICATIONS

International Search Report dated Mar. 22, 2017, in International Application No. PCT/FR2016/053608 (3 pages).

* cited by examiner

BLADE, ASSOCIATED FAN AND TURBOJET ENGINE

CROSS-REFERENCE TO RELATED APPLICATIONS

This application is the U.S. national phase entry under 35 U.S.C. § 371 of International Application No. PCT/FR2016/053608, filed on Dec. 21, 2016, which claims priority to French Patent Application No. 1563009, filed on Dec. 21, 2015, the entireties of each of which are herein incorporated by reference.

BACKGROUND OF THE INVENTION

The present invention relates to a leading-edge shield for a turbomachine blade. The term "turbomachine" is used in this context to mean any machine in which energy can be transferred between a fluid flow and at least one set of blades, e.g. such as a compressor, a pump, a turbine, a propeller, or indeed a combination of at least two of the above.

Such leading-edge shields are typically for protecting the leading edges of rotating blades or of guide vanes against impacts. The term "blades" is used in this context both for fan blades and for the blades of an aircraft propeller. In order to limit their weight, such blades are typically mainly in the form of a blade body made of organic matrix composite material, e.g. a polymer, reinforced by fibers. Although such materials present mechanical qualities that are generally very favorable, in particular compared with their weight, they are nevertheless somewhat sensitive to point impacts. Shields, typically made of very strong metal material such as titanium alloys, are thus normally installed on the leading edges of such blades, in order to protect them against such impacts. Such shields are normally in the form of a thin pressure-side wing and a thin suction-side wing joined together by a thicker section overlying the leading edge, the wings and the thicker section fitting closely to the shape of the blade on the leading edge and on the adjacent pressure-side and suction-side sections. The pressure-side and suction-side wings extend along a height and along a length respectively over these pressure-side and suction-side sections of the blade, they serve mainly to ensure that the shield is positioned and fastened on the leading edge, and they also serve to distribute the force of an impact and to dissipate its energy over a larger area of the blade body. Thus, in the event of an impact on the leading-edge shield, waves of distortion spread through the shield, including the wings, until those waves have been entirely dissipated. However, in some circumstances, that spreading may create peaks of distortion that may cause a wing to become partly separated.

OBJECT AND SUMMARY OF THE INVENTION

The present disclosure seeks to remedy those drawbacks by providing a leading-edge shield for a turbomachine blade that withstands separation better in the event of an impact.

In at least one embodiment, this object is achieved by the fact that, in said leading-edge shield, which may be made of metal material, and which includes two wings, each extending along a height from a bottom edge to a top edge and along a length from the leading edge to a rear edge, and connected together over the leading edge, at least one of said wings presents a segment, adjacent to the top edge and extending over at least 6% of said height, wherein the respective rear edge slopes towards the top edge in such a manner that an angle of intersection between a tangent to the top edge and a tangent to any point of the rear edge in said segment is less than 75°, or even less than 60°.

Such an acute angle presents the advantage, relative to a more obtuse angle, or even a right angle, of making it more difficult for the wing to separate from the junction point between the rear edge and the top edge in the event of an impact.

In order to prevent concentrations of forces, the rear edge may present tangential continuity over the entire height of the shield, the length of the wing thus varying gradually and being suitable in particular for avoiding any excessive curvature, corresponding to a radius of curvature that is below some predetermined minimum.

The present disclosure also provides a blade extending along a height from a blade root to a blade tip and comprising a blade body with such a leading-edge shield assembled on the blade body, the blade body being made of anisotropic material, the leading-edge shield being made of a material with better point impact resistance than the anisotropic material of the blade body.

In this blade, the anisotropic material may comprise at least one layer, and in particular a layer that is adjacent to the wing, with a main strength direction that is substantially parallel to an inside surface of a wing adjacent to said segment and presenting an angle relative to said top edge that is substantially greater than a maximum value for said angle of intersection in said segment, in order to withstand blade bending forces better. The anisotropic material may in particular be a composite material reinforced with fibers oriented along at least said main direction. Since the rear edge of the wing is prevented from being in alignment with the main direction in the vicinity of the blade tip, it becomes more difficult to tear the wing away from the rear edge, which could otherwise be made easier by the lower strength of the anisotropic material of the blade body perpendicular to its main direction.

The present disclosure also provides a turbomachine having a plurality of such blades, a fan having a plurality of such blades, and a turbofan including such a fan.

BRIEF DESCRIPTION OF THE DRAWING

The invention can be well understood and its advantages appear better on reading the following detailed description of an embodiment shown as a nonlimiting example. The description refers to the accompanying drawing, in which.

DETAILED DESCRIPTION OF THE INVENTION

Figure 1:
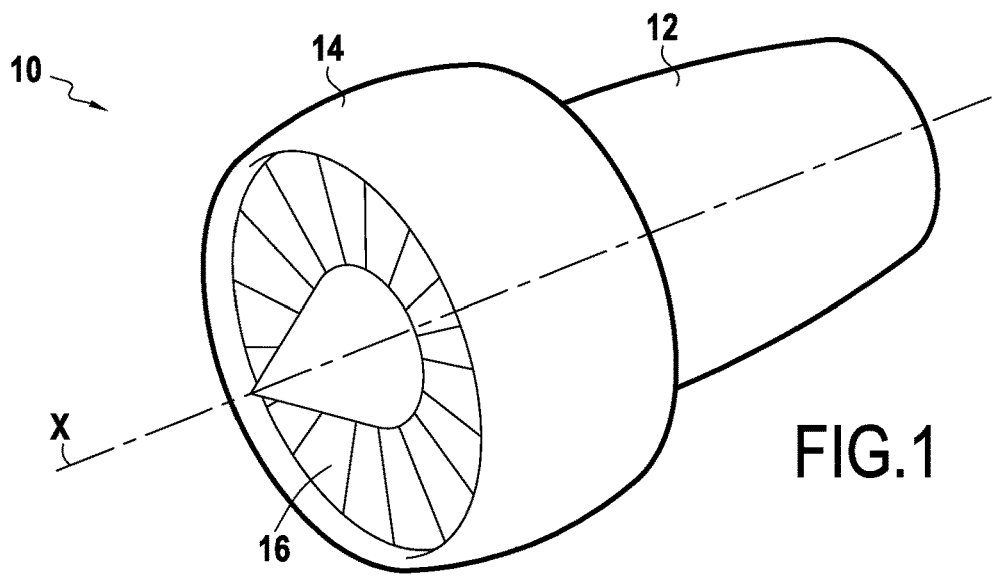
FIG. 1 is a diagrammatic perspective view of a turbofan.
Figure 2:
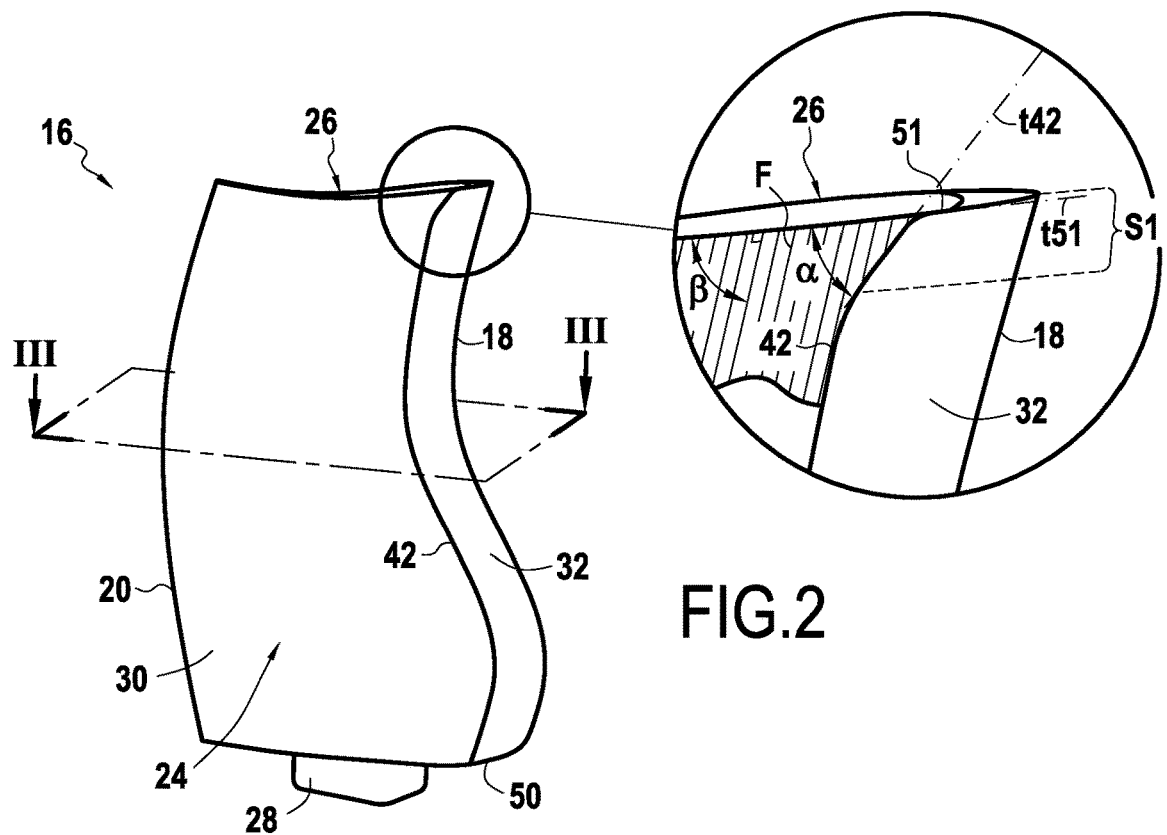
FIG. 2 is a diagrammatic perspective view of the suction side of a rotary blade of the FIG. 1 turbofan fan in a first embodiment of the blade.
Figure 3:
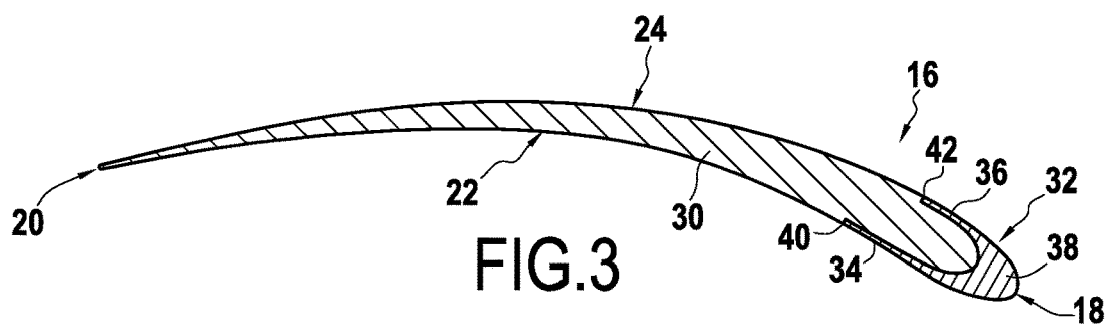
FIG. 3 is a fragmentary section view of the blade of FIG. 2 on the plane III-III.

FIG. 1 shows a turbofan 10 having a gas generator unit 12 and a fan 14. The fan 14 has a plurality of rotary blades 16 arranged radially around a central axis X, the blades being aerodynamically profiled so as to impel air when they rotate and being surrounded by a fan casing. Thus, as shown in FIGS. 2 and 3, each blade 16 presents a leading edge 18, a trailing edge 20, a pressure side 22, a suction side 24, a blade tip 26, and a blade root 28. Furthermore, the blade 16 comprises a blade body 30 made of composite material, in particular having a polymer matrix reinforced by fibers.

These fibers may present at least one particular orientation, thereby giving rise to at least one main strength direction, and thus to the material being anisotropic. More specifically, in order to be better at withstanding centrifugal and bending forces on the blade, this main direction may be the height direction of the blade 16, from the blade root 28 to the blade tip 26.

In normal operation, the relative airflow is oriented substantially towards the leading edge 18 of each blade 16. Thus, the leading edge 18 is particularly exposed to impacts. It is therefore appropriate to protect the leading edge 18 with a leading-edge shield 32 integrated in each blade 16. In other words, the leading-edge shield 32 is assembled on the blade body 30.

The leading-edge shield 32 is made of a material with better point impact resistance than the composite material of the blade body 30. The leading-edge shield 32 is made mainly of metal, and more specifically out of a titanium-based alloy such as TA6V (Ti-6Al-4V), for example. The leading-edge shield 32 could equally well be made of steel or of the metal alloy commonly referred to by the registered trademark Inconel™. The term "Inconel" is used below to refer to an alloy based on iron alloyed with nickel and chromium.

As shown in particular in FIG. 3, the leading-edge shield 32 has a pressure-side wing 34, a suction-side wing 36, and a thicker central section 38 that is to overlie an edge of the blade body 30 and that joins together the pressure-side wing 34 and the suction-side wing 36 at the leading edge 18. The pressure-side and suction-side wings 34 and 36 serve to position the shield 32 on the blade body 30, and also to dissipate impact energy. Each of the pressure-side and suction-side wings 34, 36 extends over a height H from a bottom edge 50 to a top edge 51 and along a length, from the leading edge 18 to the corresponding rear edge 40, 42.

In order to be better at dissipating the energy of waves of distortion spreading through the shield 32 following an impact, the rear edge 42 of the suction-side wing 36 is not parallel to the leading edge 18 over its entire length, but slopes in the vicinity of the top edge 51 in such a manner that, over an entire segment S1 adjacent to the top edge 51, the angle of intersection α between a tangent t51 to the top edge 51 and a tangent t42 to any point of the rear edge 42 is less than 75°, or even less than 60°. The segment S1 may for example extend over 10%, or even 15% of the height H of the shield 30 from the top edge 51. The slope of the rear edge 42 towards the leading edge 18 on going towards the top edge 51 reduces the length of the suction-side wing 36 locally, which contributes to preventing any local separation of the shield 32 from spreading along the rear edge 42.

Since at least some of the fibers F of the composite material of the blade body 30 are oriented along the height of the blade 16, this main direction of the composite material of the blade body 30 presents an angle β that is substantially a right angle relative to the top edge 51 of the shield 32 in a plane that is substantially parallel to an inside surface of the suction-side wing 36. More specifically, this angle β may lie in the range 60° and 120°, or even in the range 75° and 105°. More particularly, as shown in FIG. 3, fibers F in this orientation may be incorporated in a layer, e.g. of fibers that are unidirectional or woven in at least two directions, which layer is close to or even adjacent to the suction side 24, even though the composite material of the blade body 30 may be covered in a layer of varnish or paint on this surface.

The slope of the rear edge 42 of the suction-side wing 36 in the vicinity of the top edge 51, serves in particular to be ensured that the angle of intersection α between the tangent t42 to any point of the rear edge 42 in the segment S1 is substantially less than, e.g. at least 5°, or even 10°, or even 15° or 25° less than, the angle β, in such a manner as to avoid the rear edge 42 being in alignment with these fibers F, which would make it easier for the rear edge 42 to be torn away with one or more fragments of the composite material in the event of an impact.

Although the present invention is described with reference to a specific embodiment, it is clear that various modifications and changes can be undertaken on this embodiment without going beyond the general ambit of the invention as defined by the claims. In particular, although in the embodiment described and shown only the suction-side wing presents a sloping rear edge in the vicinity of the top edge, the invention also applies to the pressure-side wing, or even to both wings. Consequently, the description and the drawings should be considered in a sense that is illustrative rather than restrictive.

The invention claimed is:

1. A blade extending along a height from a blade root to a blade tip and comprising a blade body and a leading-edge shield assembled on the blade body, the blade body being made of anisotropic material, and the leading-edge shield with better point impact resistance than the anisotropic material of the blade body, said leading-edge shield including two wings, each extending along a height from a bottom edge to a top edge and along a length, from the leading edge to a respective rear edge, the wings being connected together over the leading edge, and at least one of the wings, presenting a segment, adjacent to the top edge and extending over at least 6% of the height, the respective rear edge sloping towards the top edge in such a manner that an angle of intersection between a tangent to the top edge and a tangent to any point of the rear edge in said segment is less than 75°, the anisotropic material comprising at least one layer with a main strength direction that is substantially parallel to an inside surface of a wing adjacent to said segment and presenting an angle relative to said top edge that is between 75° and 105° and substantially greater than a maximum value for said angle of intersection in said segment.

2. The blade according to claim 1, wherein said angle of intersection is less than 60°.

3. The blade according to claim 1, wherein the leading edge shield is made of metal material.

4. The blade according to claim 1, wherein said anisotropic material is a composite material reinforced with fibers oriented along at least said main strength direction.

5. A fan including a plurality of blades according to claim 1.

6. A turbofan (10) including the fan according to claim 5.

* * * * *